UNITED STATES PATENT OFFICE.

OTTO G. WINCKLER, OF NEW YORK, N. Y.

VETERINARY MEDICINE.

No. 917,507.      Specification of Letters Patent.      Patented April 6, 1909.

Application filed December 16, 1905. Serial No. 292,052.

*To all whom it may concern:*

Be it known that I, OTTO G. WINCKLER, a citizen of the United States, residing in the borough of Brooklyn, city, county, and State of New York, have invented a new and useful Veterinary Medicine, of which the following is a specification.

My invention consists of a medicine for horses and other animals, the object being to cause perfect digestion and purification of the blood thereof.

In carrying out my invention, I take 18 parts of finely ground oatmeal, 10 parts of flour of sulfur, 8 parts of Glauber salts, 28 parts of rye Graham meal, and ½ part of pulverized root of mountain ash. The Glauber salts are dissolved in about 35 parts of distilled boiling water and the ingredients are mixed together forming a dough which is shaped into cakes which are placed in an oven and subjected on one side, for about 30 minutes, to a gas fire. Then the cakes are allowed to cool and turned, when the other side is similarly exposed to the action of the gas fire and again allowed to cool. The cakes as thus primarily baked are next placed in an oven, heated to a temperature of about 136° Fah., they being imposed on a wire screen or grating and subjected to heat for about two hours. The cakes are then turned and the other side subjected to the last-named heat, they thus being baked to entire extent. It will be found that as the Glauber salts and the soluble constituents of mountain ash root are dissolved, they permeate the meal, thus medicating the same and producing with the other ingredients an article, of which the animal will freely partake to a required extent, without necessarily being mixed with other food for the animal.

Having thus described my invention, what I claim as new and desire to secure by Letters Patent, is:

1. A medicine for animals in the form of cakes, composed of oatmeal, sulfur, Glauber salts, meal, and the root of mountain ash, with the meal permeated by the sulfur, Glauber salts and said soluble constituents of the mountain ash root in substantially the proportions specified.

2. The process of preparing a medicine for animals in the form of a cake, which consists in dissolving Glauber salts in boiling water, mixing therewith pulverized root of mountain ash, finely ground oatmeal, sulfur, and rye Graham meal, shaping the dough into cakes, subjecting one side of the cakes to the direct action of a fire to permeate the oatmeal and rye Graham meal with the other ingredients, and then turning the cakes and subjecting the other side to the direct action of a fire, and then subjecting the cake to further heat, substantially as described.

OTTO G. WINCKLER.

Witnesses:
    HUL E. KORHN,
    GEO. C. WINCKLER.